US009242722B2

(12) United States Patent
Buoy et al.

(10) Patent No.: US 9,242,722 B2
(45) Date of Patent: Jan. 26, 2016

(54) JOYSTICK FOR CONTROLLING AN AIRCRAFT

(71) Applicant: SAGEM DEFENSE SECURITE, Boulogne-Billancourt (FR)

(72) Inventors: Florence Buoy, Boulogne-Billancourt (FR); Etienne Merlet, Boulogne-Billancourt (FR); Herve Gorecki, Boulogne-Billancourt (FR); Oleg Gomolko, Boulogne-Billancourt (FR); Sebastien Fontaine, Boulogne-Billancourt (FR); Yann Vandenbaviere, Boulogne-Billancourt (FR); Christian Gouard, Boulogne-Billancourt (FR); Guillaume Pointel, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/405,758

(22) PCT Filed: Jun. 7, 2013

(86) PCT No.: PCT/EP2013/061792
§ 371 (c)(1),
(2) Date: Dec. 4, 2014

(87) PCT Pub. No.: WO2013/182679
PCT Pub. Date: Dec. 12, 2013

(65) Prior Publication Data
US 2015/0158575 A1    Jun. 11, 2015

(30) Foreign Application Priority Data

Jun. 7, 2012 (FR) ...................... 12 55322

(51) Int. Cl.
*G05G 9/047* (2006.01)
*B64C 13/04* (2006.01)

(52) U.S. Cl.
CPC ................ *B64C 13/04* (2013.01); *G05G 9/047* (2013.01); *G05G 2009/04707* (2013.01); *G05G 2009/04714* (2013.01); *G05G 2009/04766* (2013.01); *Y10T 74/20201* (2015.01)

(58) Field of Classification Search
CPC .................... G05G 9/047; G05G 2009/04707; G05G 2009/04714; G05G 2009/04766
See application file for complete search history.

(56) References Cited

U.S. PATENT DOCUMENTS 1,415,176 A * 5/1922 Hughes .................. B64C 13/30
244/224
3,394,611 A * 7/1968 Beurrier .................. G05G 5/05
338/128

(Continued)

*Primary Examiner* — David M Fenstermacher
(74) *Attorney, Agent, or Firm* — Blakely Sokoloff Taylor & Zafman LLP

(57) ABSTRACT

The invention relates to a joystick (200) for controlling an aircraft, including a frame (201), a lever (202) mounted so as to be rotatably movable relative to the frame, and a mechanical linking assembly (203) for connecting the lever to the frame, the mechanical linking assembly (203) including: a first linking piece (213, 223) movably mounted relative to the frame (201) about a first rotation axis (X), a second linking piece (233, 243) movably mounted relative to the frame (201) about a second rotation axis (Y), the second rotation axis forming a non-zero angle with the first rotation axis, a third intermediate piece (255, 265) mounted so as to the rotatably movable relative to the first linking piece (213, 223) about a third rotation axis (Y'), a fourth intermediate piece (275, 285) mounted so as to be rotatably movable relative to the second linking piece (233, 243) about a fourth rotation axis (X'), the fourth rotation axis forming a non-zero angle with the third rotation axis, in which the linking pieces (213, 223; 233, 243) or the intermediate pieces (255, 265; 275, 285) are rotatably movable in relation to one another about a fifth rotation axis (Z') forming a non-zero angle with the first rotation axis (X) and the second rotation axis (Y) or with the third rotation axis (Y') and the fourth rotation axis (X'), respectively, so as to enable a variation of the angle formed between the first rotation axis and the second rotation axis or of the angle formed between the third rotation axis and the fourth rotation axis, respectively.

19 Claims, 16 Drawing Sheets

(56) References Cited

U.S. PATENT DOCUMENTS

Figure 1A:
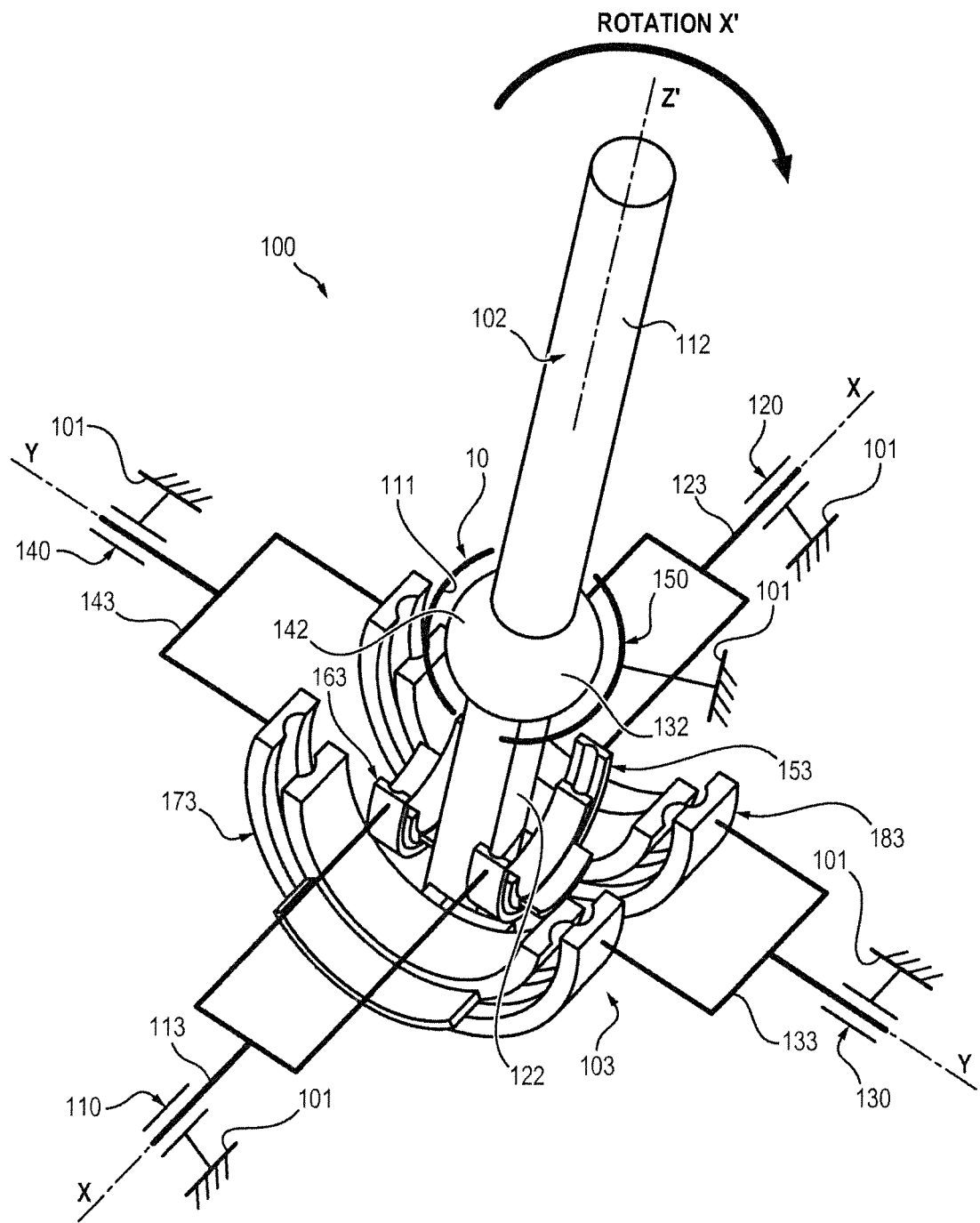

| | | | | |
|---|---|---|---|---|
| 3,757,597 A | * | 9/1973 | Vogel | G05G 5/16 74/471 XY |
| 4,587,510 A | * | 5/1986 | Kim | G05G 9/047 338/128 |
| 6,002,351 A | * | 12/1999 | Takeda | G05G 9/047 200/6 A |
| 6,128,971 A | * | 10/2000 | Papasideris | G05G 9/047 74/471 R |
| 6,328,127 B1 | * | 12/2001 | Hori | B62D 11/183 180/333 |
| 6,437,771 B1 | * | 8/2002 | Rosenberg | G09B 23/28 345/156 |
| 6,647,820 B2 | * | 11/2003 | McKeown | G05G 5/12 180/333 |
| 7,320,263 B2 | | 1/2008 | Gustafsson | |
| 7,723,628 B2 | * | 5/2010 | Jarrett | G05G 5/06 200/318 |

\* cited by examiner

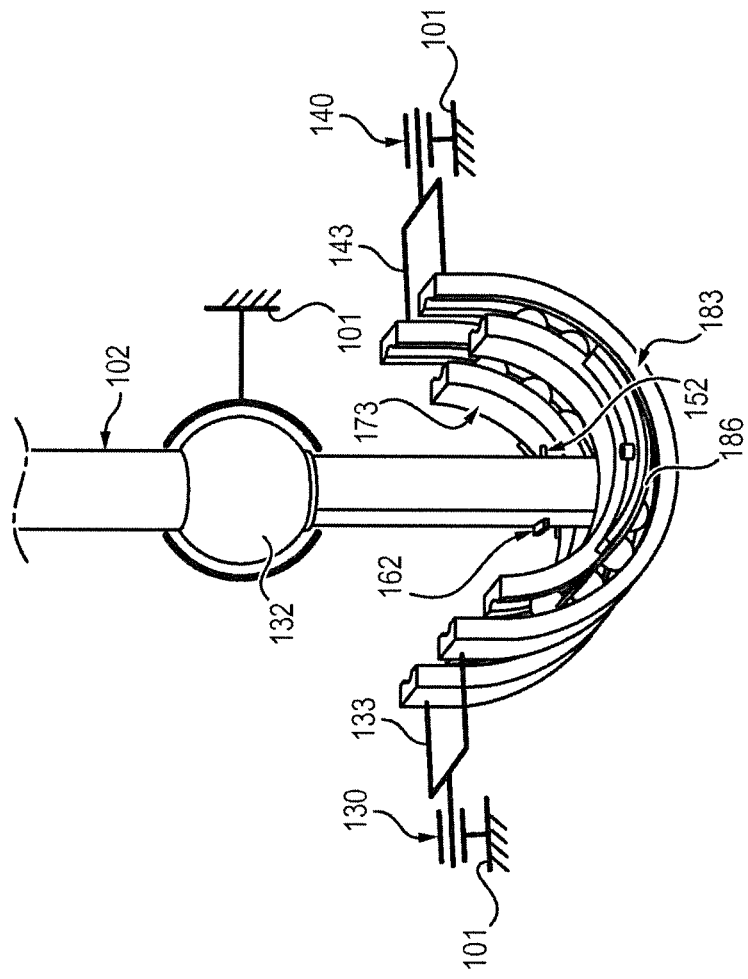
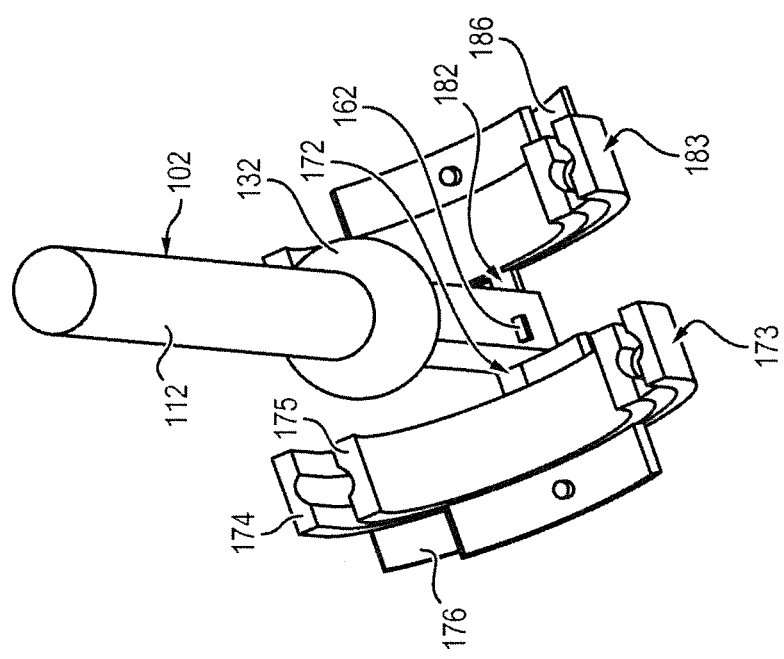

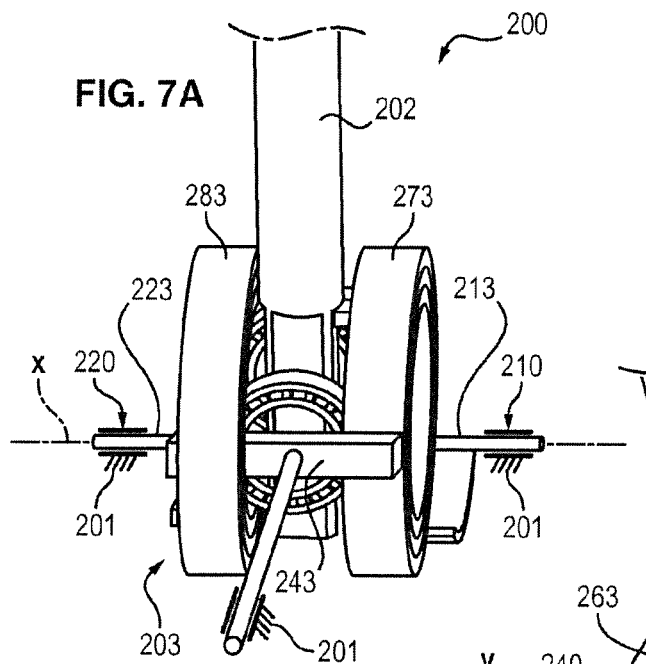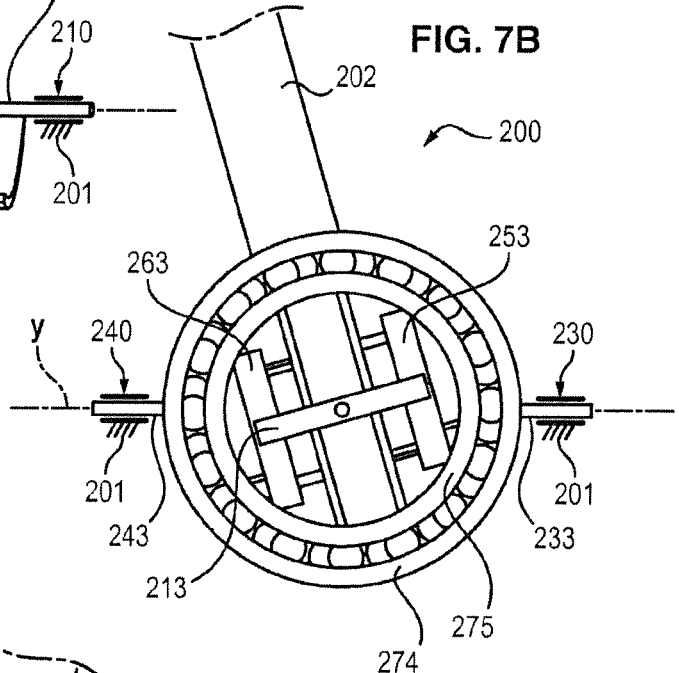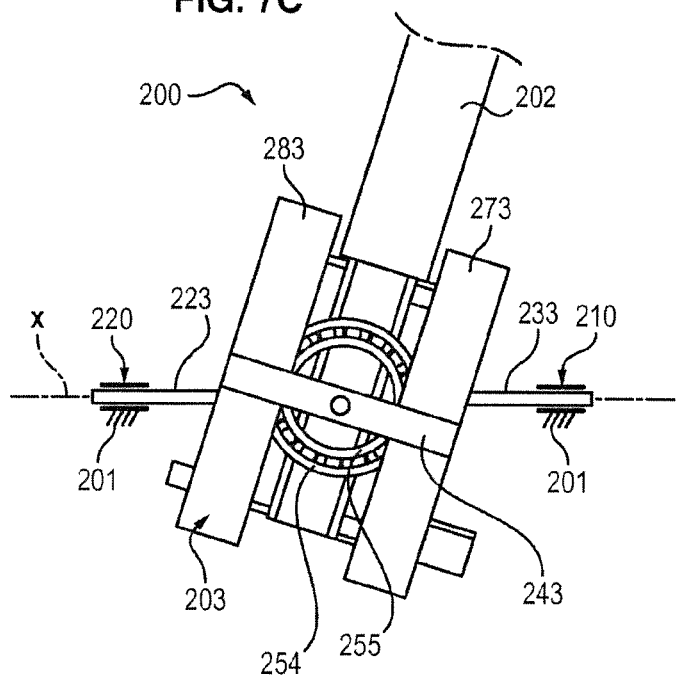

ated with a joystick structured about the fifth axis of rotation and the fourth axis of rotation.

JOYSTICK FOR CONTROLLING AN AIRCRAFT

FIELD OF THE INVENTION

The invention relates to a joystick for controlling an aircraft.

PRIOR ART

Aircraft are traditionally equipped with a steering lever for the pilot to operate the ailerons and elevator to control the attitude of the aircraft on the pitch and roll axes. The steering handle is positioned between the legs of the pilot who uses the strength of his arm to actuate the handle.

In some planes equipped with electric flight controls, the control lever has been replaced by a control device called a "joystick". More compact than a conventional control lever, the joystick is generally integrated into a pilot's seat armrest and comprises a lever which the pilot operates solely by the movement of his wrist. Installing joysticks has freed up the space between the pilot and the dashboard so that other equipment can be installed.

Also, the joystick generally includes a set of springs for exerting a return force on each of the axes of rotation of the lever (roll axis and pitch axis) and to return the lever to a neutral position when the pilot exerts no force on the lever.

However, existing mechanical joystick structures do not generally allow decoupling of return forces between the two axes of rotation of the lever. In other words, the return force exerted on an axis of the lever depends on the angular position of the lever according to the other axis.

Also, neither do these structures generate linear return forces (that is, the intensity of which is proportional to the angular position of the lever along the relevant axis of rotation).

SUMMARY OF THE INVENTION

An aim of the invention is to propose a joystick structure allowing decoupling between the return forces exerted on each of the axes.

This problem is resolved within the scope of the present invention thanks to a joystick for controlling an aircraft, comprising a frame, a lever mounted mobile in rotation relative to the frame, and a mechanical linking assembly of the lever to the frame, the mechanical linking assembly comprising:
  a first linking piece mounted mobile relative to the frame about a first axis of rotation,
  a second linking piece mounted mobile relative to the frame about a second axis of rotation, the second axis of rotation forming a non-zero angle with the first axis of rotation,
  a third intermediate piece mounted mobile in rotation relative to the first linking piece about a third axis of rotation,
  a fourth intermediate piece mounted mobile in rotation relative to the second linking piece about a fourth axis of rotation, the fourth axis of rotation forming a non-zero angle with the third axis of rotation,
  in which the linking pieces or the intermediate pieces are mobile in rotation one relative to the other about a fifth axis of rotation forming a non-zero angle respectively with the first axis of rotation and the second axis of rotation or with the third axis of rotation and the fourth axis of rotation so as to authorise respectively a variation of the angle formed between the first axis of rotation and the second axis of rotation or of the angle formed between the third axis of rotation and the fourth axis of rotation.

Because of the joystick structure proposed, it is possible to exert return forces on the first linking piece and on the second linking piece totally independently.

In addition, the existence of a fifth axis of rotation enables misalignment between the first axis of rotation and the fourth axis of rotation and/or between the second axis of rotation and the third axis of rotation. This added degree of liberty enables displacement of the lever in rotation simultaneously according to the first axis of rotation and according to the second axis of rotation, despite misalignment occurring between the axes of the fixed framework materialised by the frame (first and second axes of rotation) and the axes of the pivoting framework materialised by the linking pieces (third and fourth axes).

The joystick according to the invention can in addition have the following characteristics:
  the mechanical linking assembly comprises a linking member comprising an external ring and an internal ring rotatably mounted one relative to the other about the fifth axis of rotation, each of the linking pieces or respectively intermediate pieces being connected to a respective ring of the linking member, the lever being connected to the third intermediate piece and/or the fourth intermediate piece,
  one of the rings of the linking member is fixed relative to the first linking piece and the other ring is fixed relative to the second linking piece,
  one of the rings of the linking member is fixed relative to the frame so as to authorise rotation only of the first linking piece or only of the second linking piece relative to the frame about the fifth axis of rotation,
  the linking member comprises at least one roller rotatably mounted about an axis of rotation fixed relative to the frame, the roller being interposed between the internal ring and the external ring such that rotation of one of the rings relative to the frame concurrently causes rotation in the opposite direction of the other ring relative to the frame,
  one of the rings of the linking member is fixed relative to the third intermediate piece and the other ring is fixed relative to the fourth intermediate piece,
  one of the rings of the linking member is fixed relative to the lever so as to authorise rotation of the lever only relative to the third intermediate piece or only relative to the fourth intermediate piece about the fifth axis of rotation,
  the linking member comprises at least a roller rotatably mounted about an axis of rotation fixed relative to the lever, the roller being interposed between the internal ring and the external ring such that rotation of one of the rings relative to the lever concurrently causes rotation in the opposite direction of the other ring relative to the lever,
  the mechanical linking assembly comprises a linking member comprising a fixed part and a part mounted mobile relative to the fixed part, the linking member comprising at least two flexible blades, each flexible blade connecting the parts together and being elastically deformable to authorise rotation of the mobile part relative to the fixed part, the flexible blades being capable of generating compensating torque tending to oppose rotation of the parts relative to each other,
  the third intermediate piece or the fourth intermediate piece is fixed to a part of the linking member and the lever is fixed to the other part of the linking member, the lever is connected to the frame by a ball-joint link enabling rotation of the lever according to the three axes of rotation relative to the frame, the lever is connected to the frame by a cardan link enabling only rotation of the lever according to the first axis and rotation of the lever according to the second axis relative to the frame, the lever is capable of simply bearing on the third intermediate piece and on the fourth intermediate piece to urge the intermediate pieces in rotation respectively according to the third and fourth axes so as to authorise relative rotation of the intermediate pieces relative to the lever according to the fifth axis of rotation, one of the intermediate pieces comprises a stop arranged such that the lever is capable of bearing on the stop to stress the intermediate piece and cause rotation of the intermediate piece in a single direction of stress, the lever is capable of bearing on the stop according to a rectilinear line of contact, parallel to the fifth axis of rotation, the lever is capable of bearing on the stop according to a cylindrical contact surface, having an axis of revolution parallel to the fifth axis of rotation, the joystick comprises a return member capable of urging one of the intermediate pieces of the linking member to oppose rotation of the intermediate piece, the return member comprises a traction spring connecting the first linking piece or the second linking piece to the intermediate piece which is driven in rotation under the action of the lever, the return member comprises a ribbon connecting the traction spring and the intermediate piece, the ribbon being capable of winding about a cylindrical element and connected to the intermediate piece.

PRESENTATION OF DRAWINGS

Figure 1B:
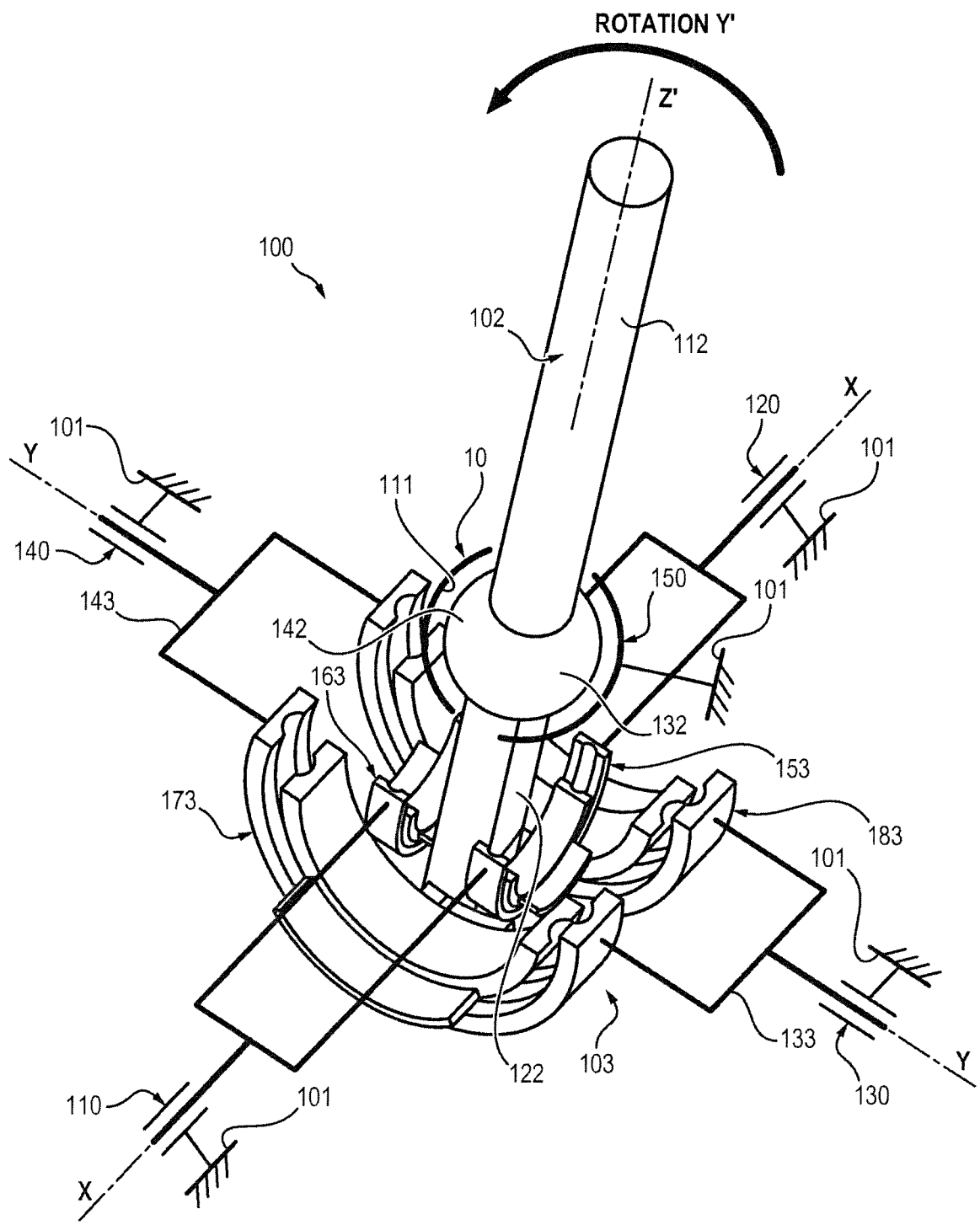
Figure 2A:
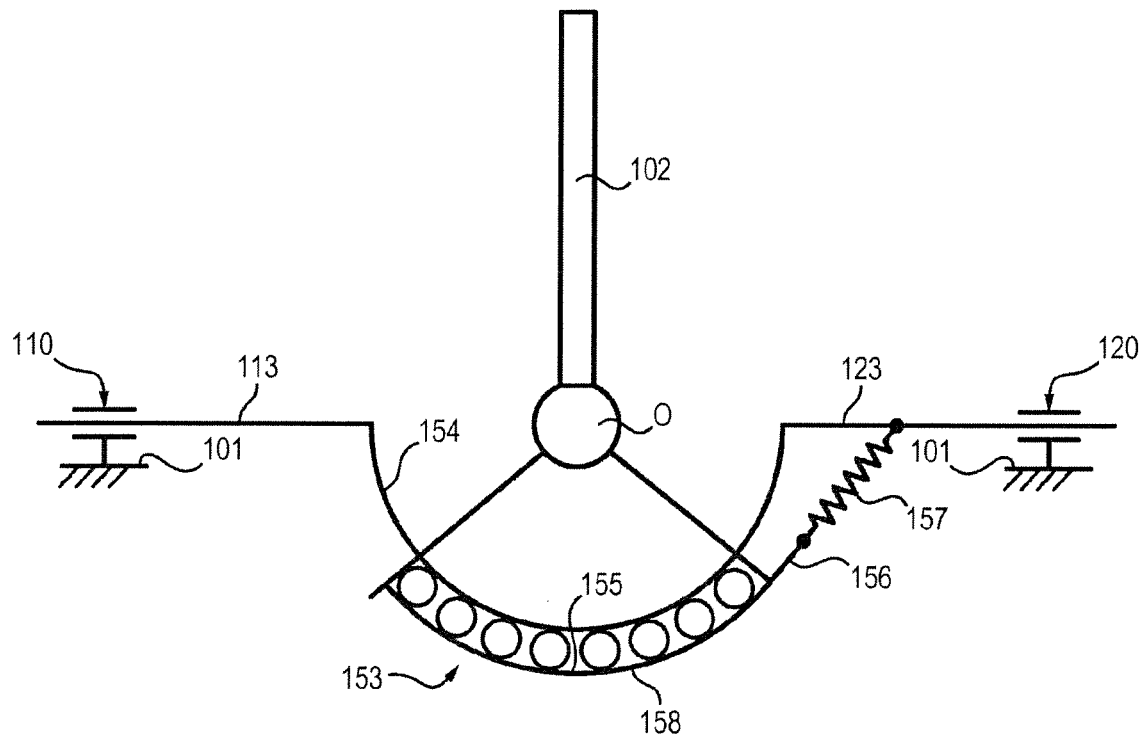
Figure 2B:
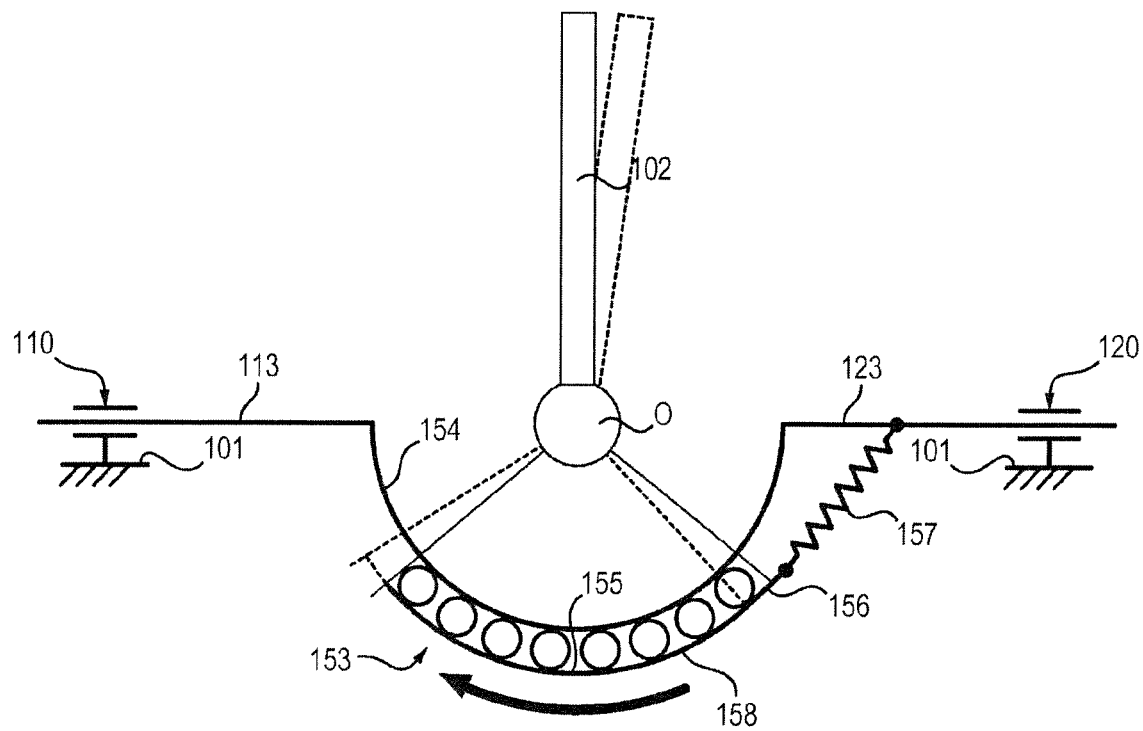
Figure 3:
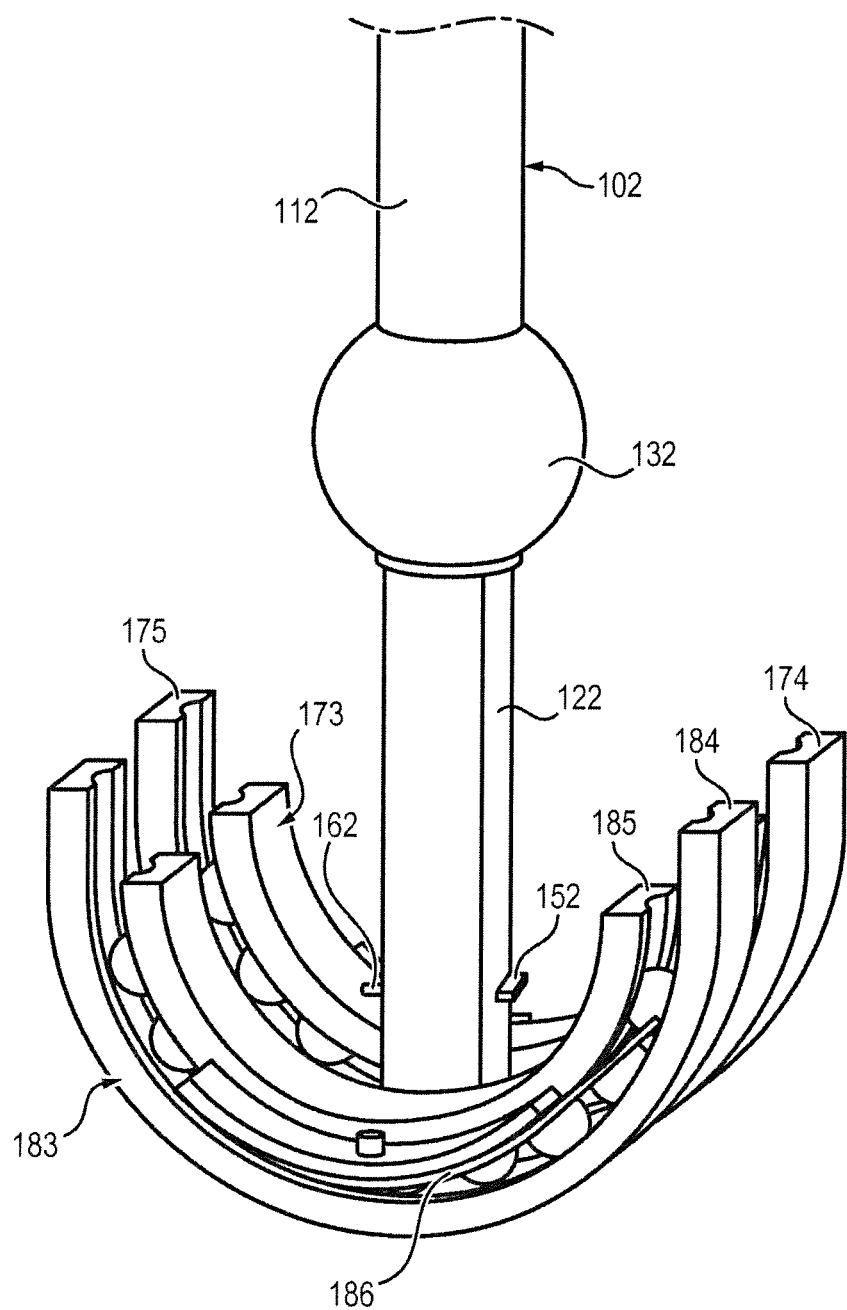
Figure 5A:
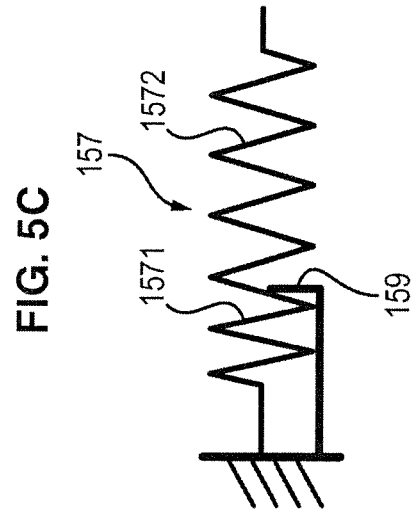
Figure 5B:
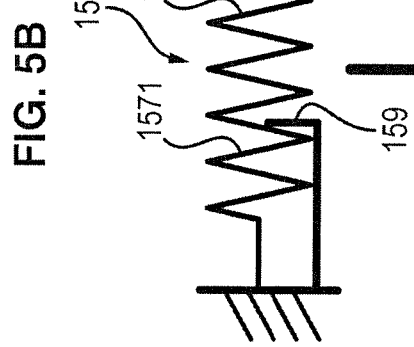
Figure 5C:
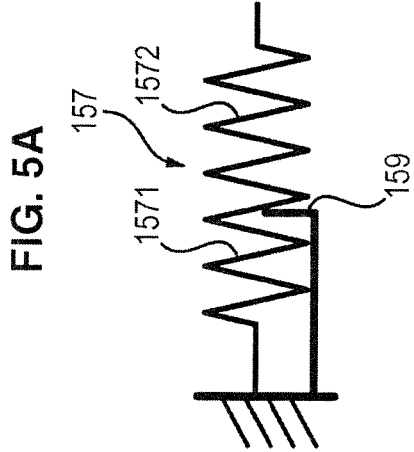
Figure 5D:
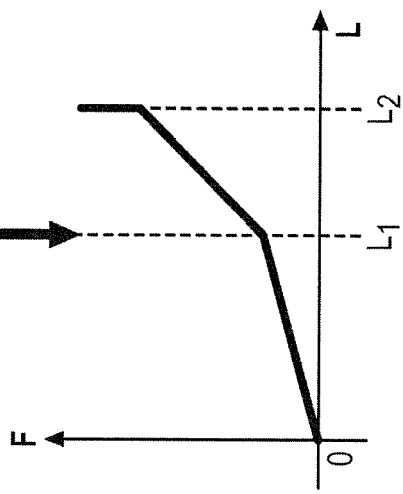
Figure 6A:
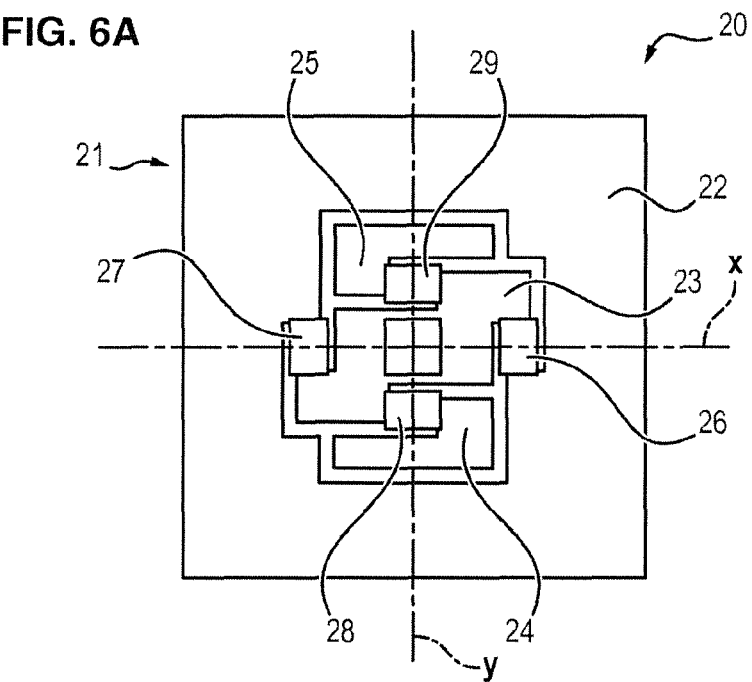
Figure 6B:
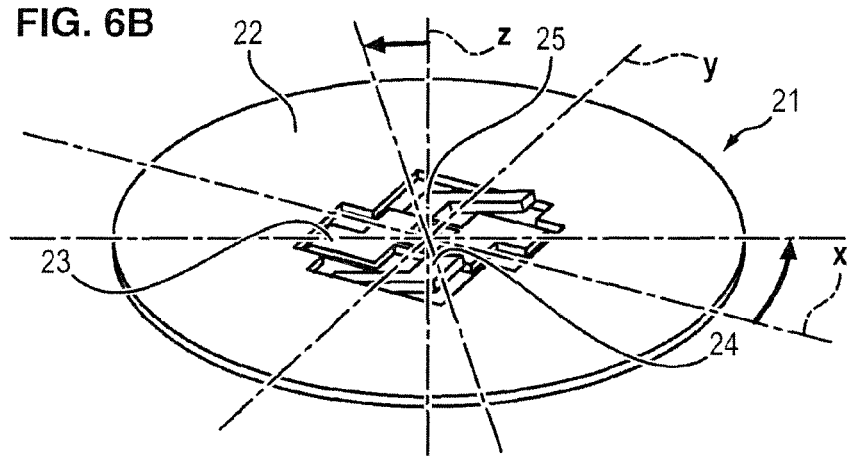
Figure 6C:
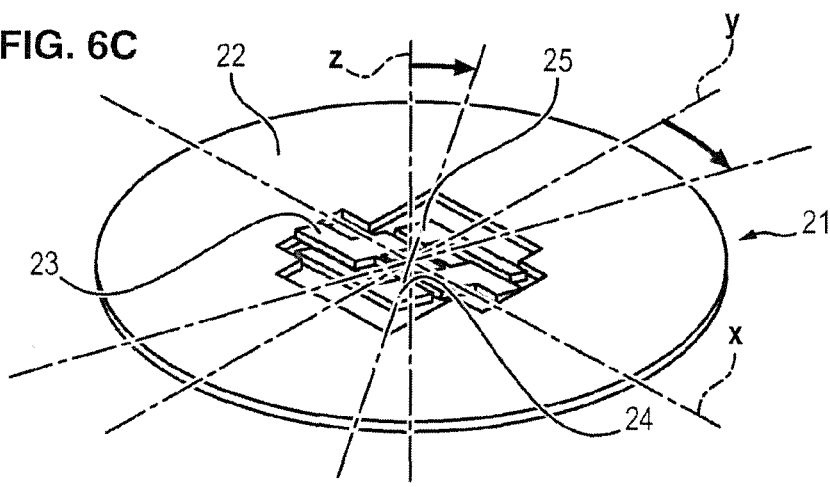
Figure 8A:
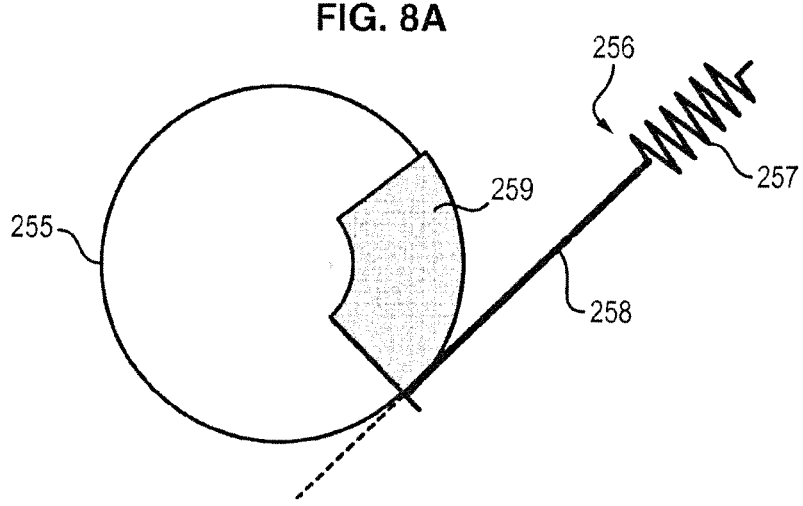
Figure 8B:
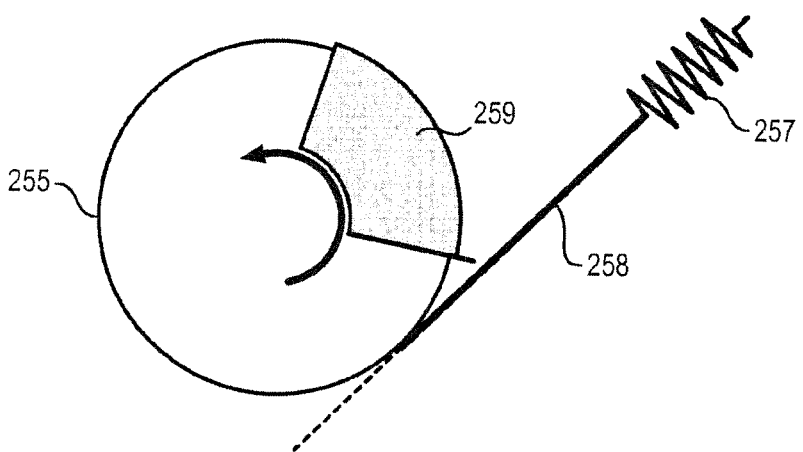
Figure 8C:
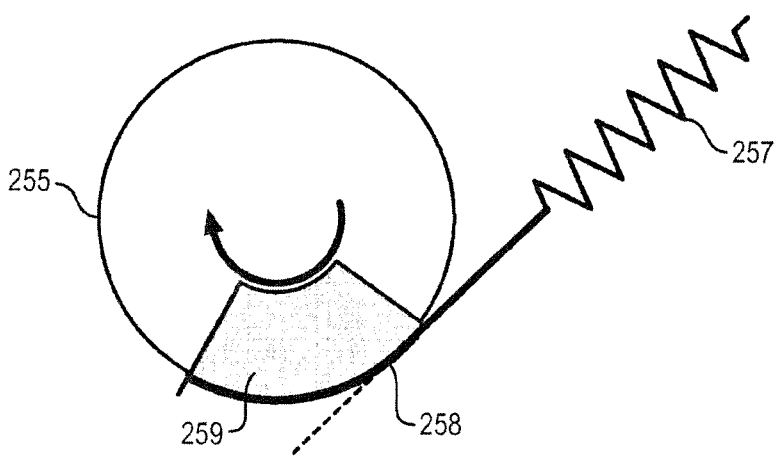
Figure 9A:
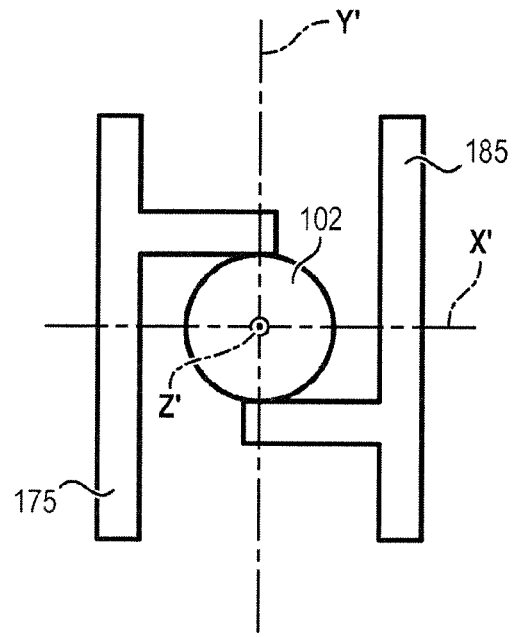
Figure 9B:
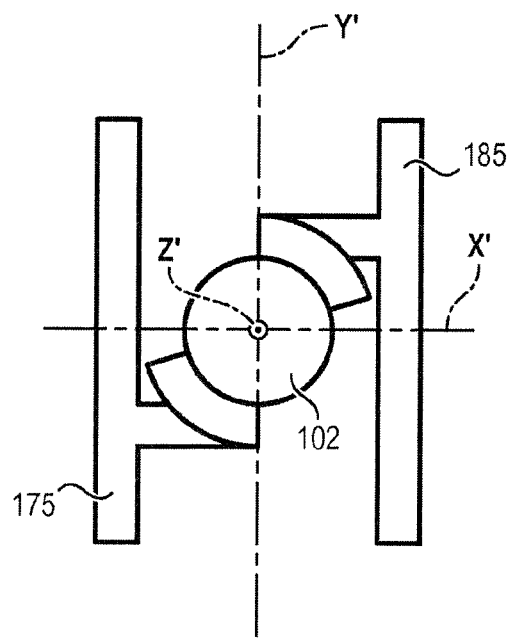
Figure 10:
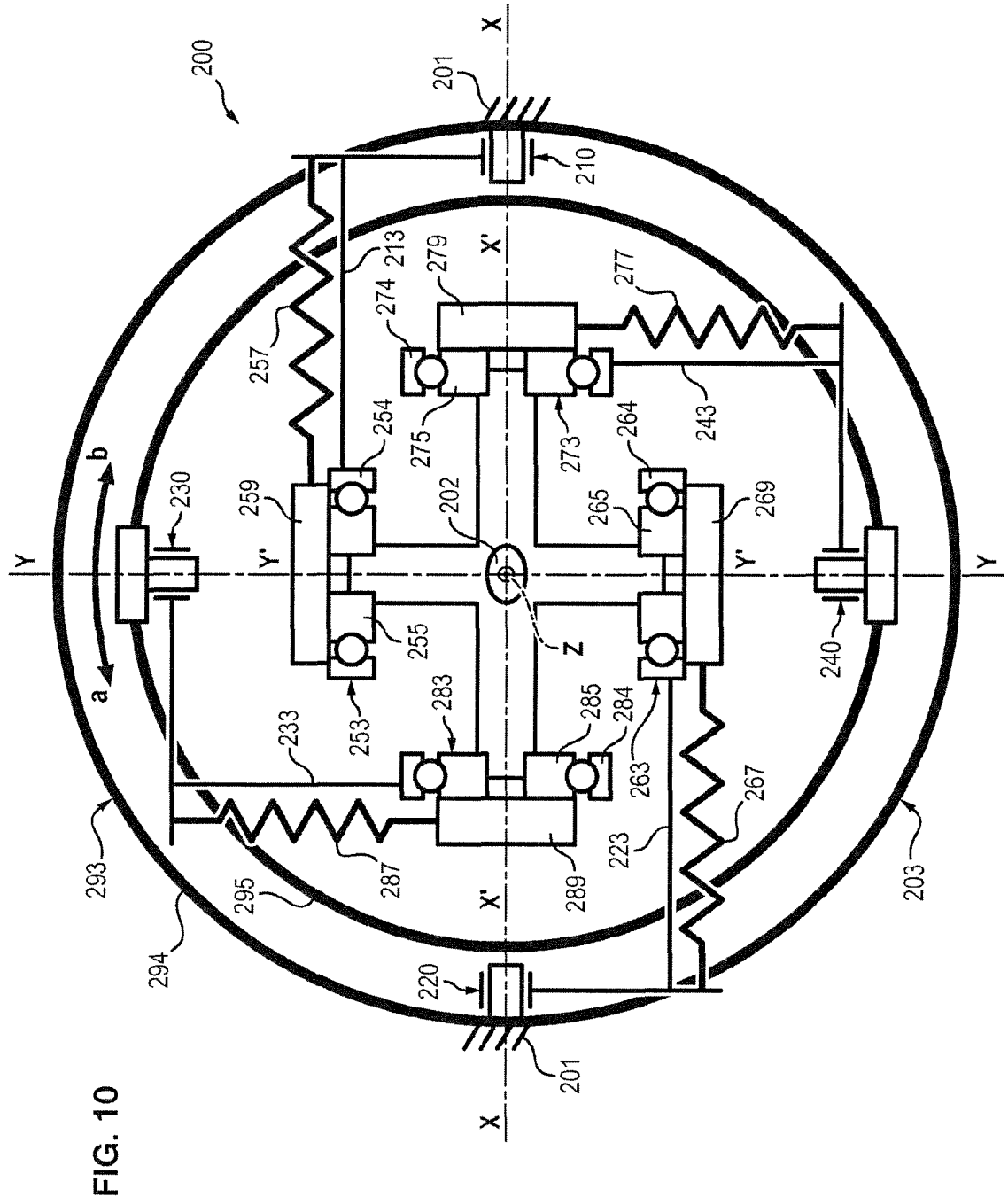
Figure 11:
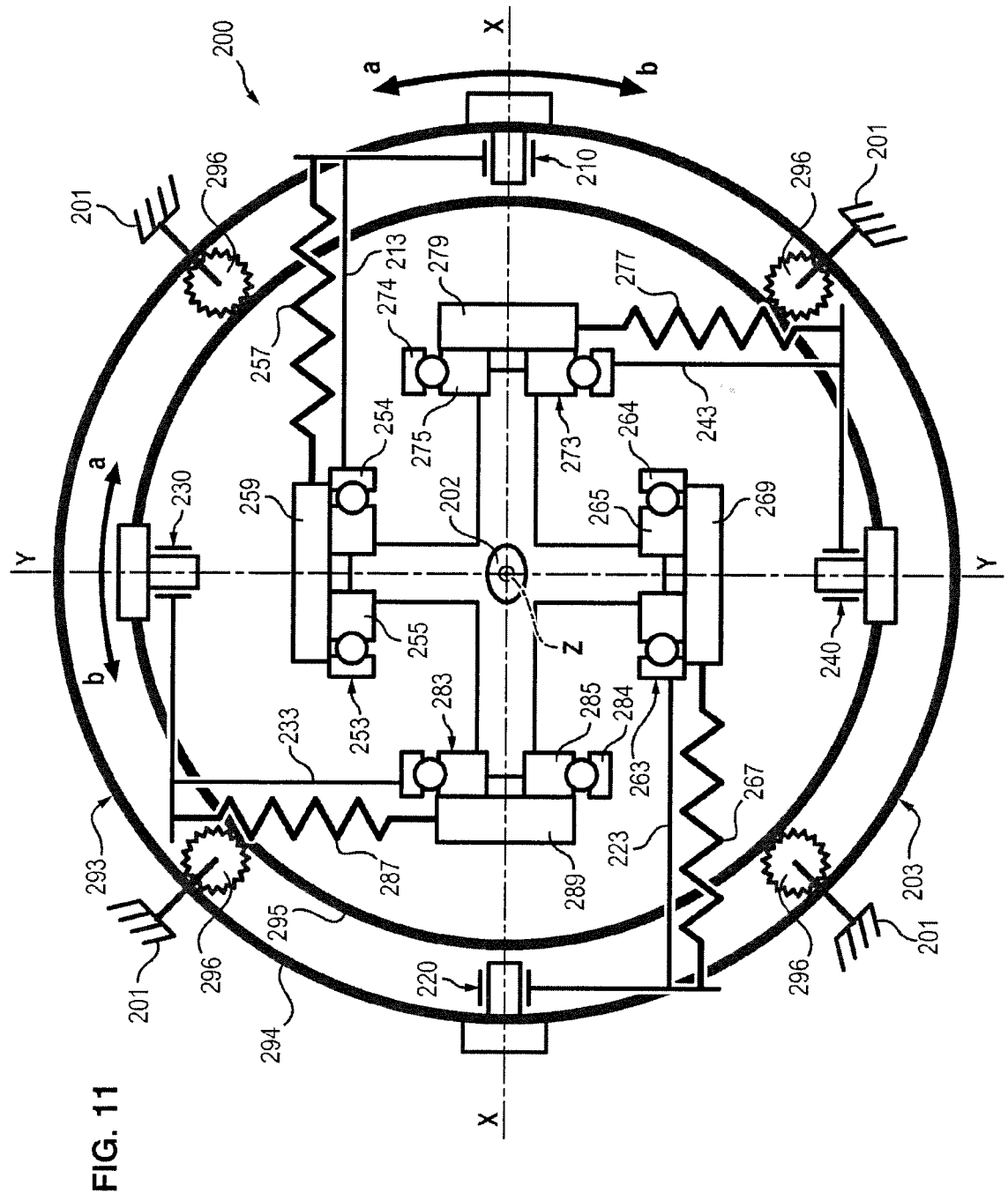
Figure 12:
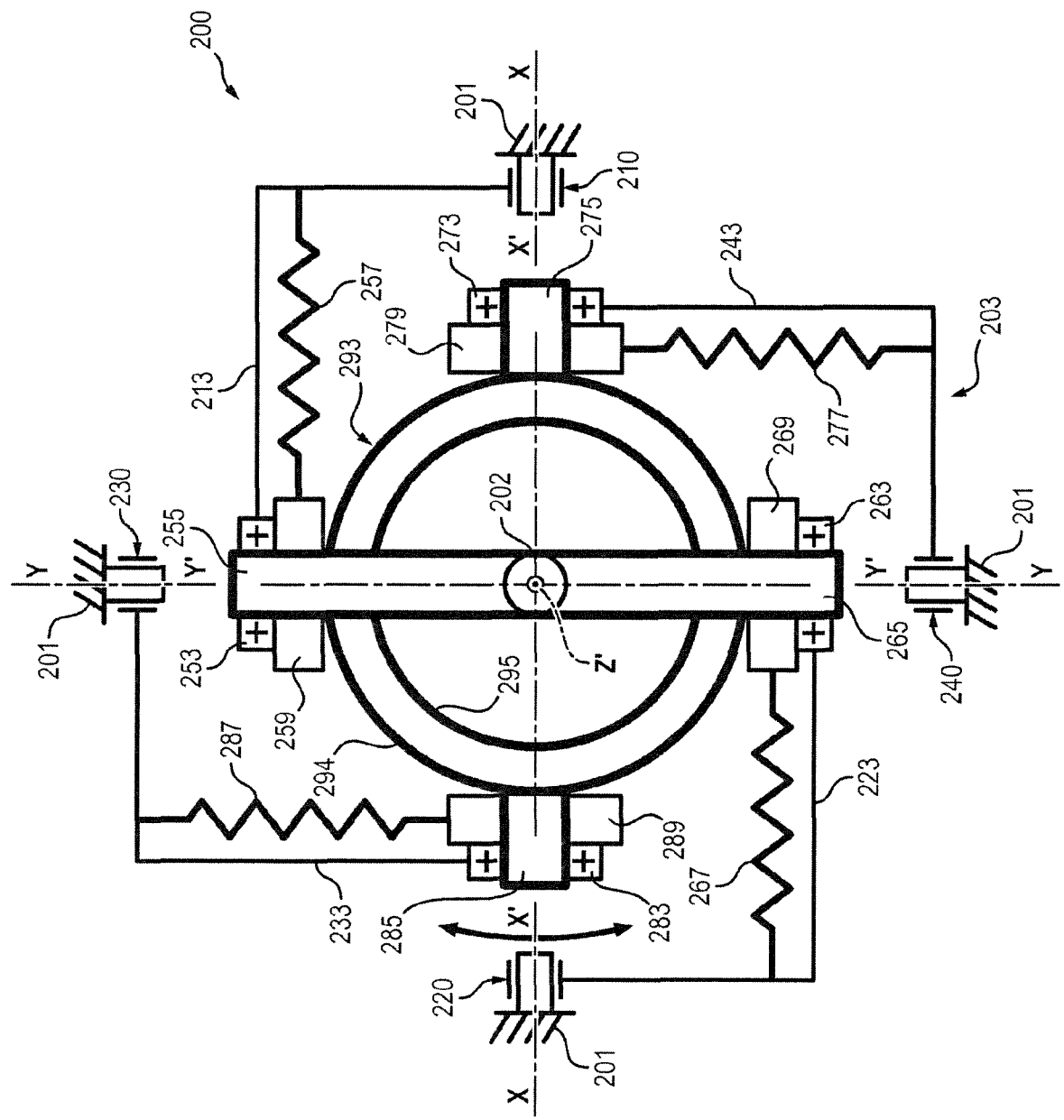
Figure 13:
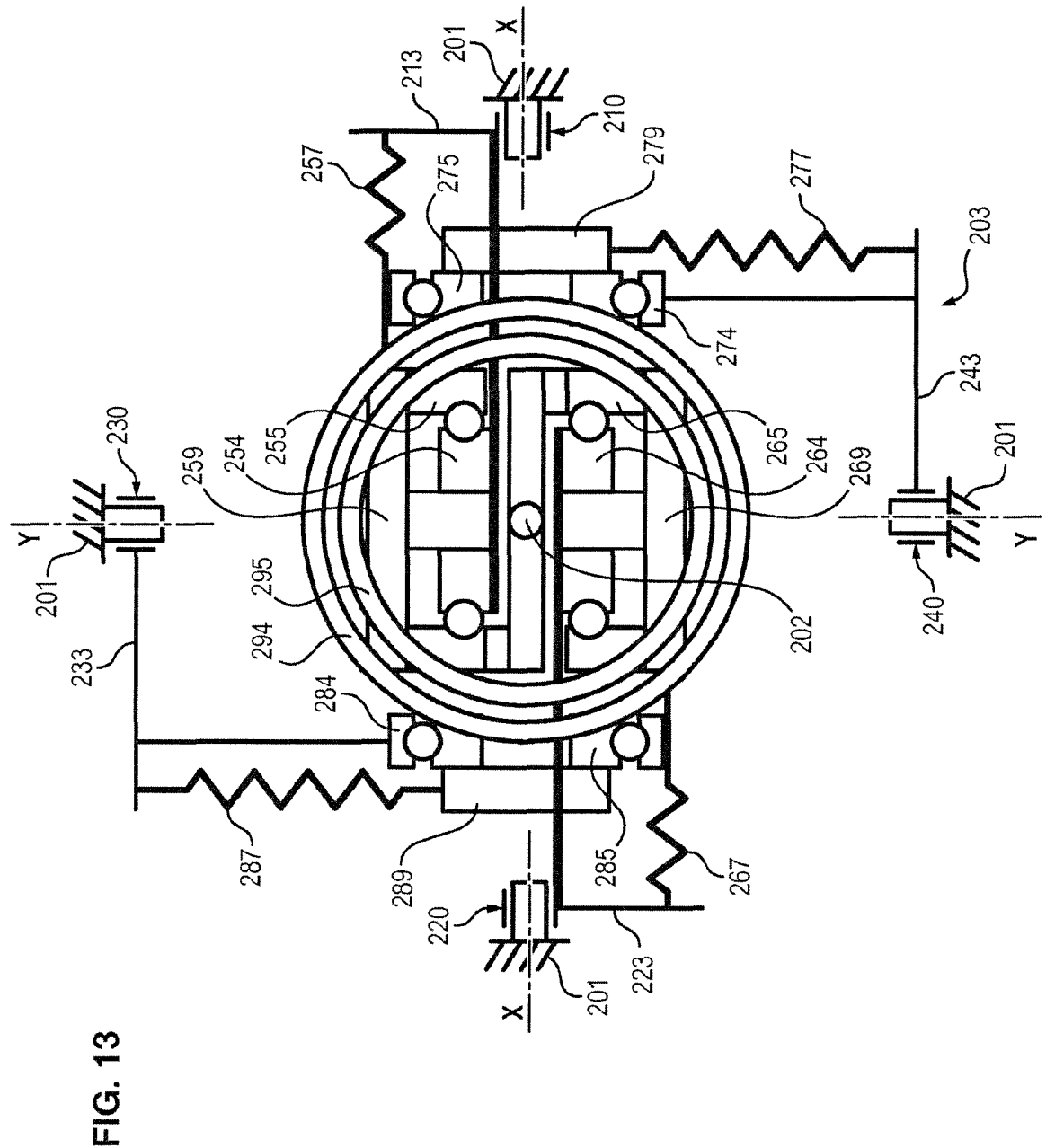
Figure 14:
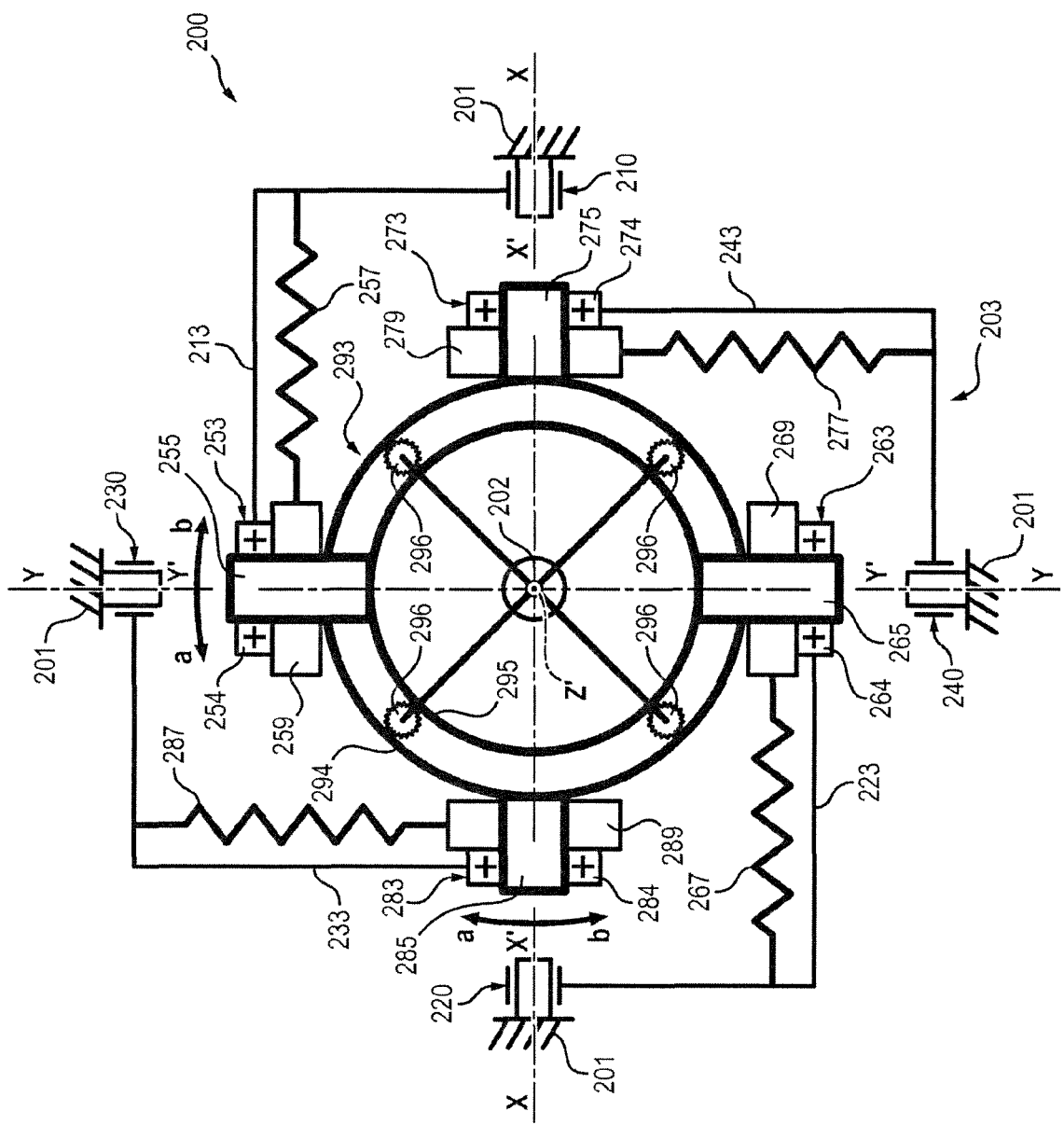

Other characteristics and advantages will emerge from the following description which is purely illustrative and non-limiting, and must be considered with respect to the appended drawings, in which:

FIGS. 1A and 1B schematically illustrate a joystick according to a first embodiment of the invention with cradles, FIGS. 2A and 2B schematically illustrate the action of a return member on an external ring of a cradle of the joystick, FIG. 3 schematically illustrates the arrangement of a return member on an internal ring of a cradle of the joystick, FIGS. 4A and 4B schematically illustrate the arrangement of two return members on the internal rings of two cradles, FIGS. 5A to 5D schematically illustrate a return member having double stiffness, FIGS. 6A to 6C schematically illustrate an example of a cardan system which can be used to mount the lever on the casing of the joystick, FIGS. 7A to 7C schematically illustrate a joystick according to a second embodiment of the invention with bearings, FIGS. 8A to 8C schematically illustrate fixing of the return member to a ring of a bearing, FIGS. 9A and 9B schematically illustrate two examples of contact between the lever and the cradles to realise the joystick of FIGS. 1A and 1B, FIG. 10 schematically illustrates a first variant of the joystick of FIGS. 7A to 7C, FIG. 11 schematically illustrates a second variant of the joystick of FIGS. 7A to 7C, FIG. 12 schematically illustrates a third variant of the joystick of FIGS. 7A to 7C, FIG. 13 schematically illustrates a fourth variant of the joystick of FIGS. 7A to 7C, FIG. 14 schematically illustrates a fifth variant of the joystick of FIGS. 7A to 7C, FIG. 15 schematically illustrates a linking member which can be used in the variants of FIGS. 12, 13 and 14 in place of the fifth bearing.

DETAILED DESCRIPTION

FIGS. 1A and 1B schematically illustrate a joystick 100 according to a first embodiment of the invention.

The joystick 100 comprises a frame 101 intended for example to be integrated into an armrest of a seat, a lever 102 mounted mobile in rotation relative to the frame, and a mechanical linking assembly 103 of the lever on the frame for generating a force feedback on the lever according to two axes of rotation.

The lever 102 has a general elongated form according to a longitudinal direction (axis Z'). More precisely, the lever 102 comprises an elongated upper part 112 intended to be gripped by the hand of the pilot, an elongated lower part 122 capable of cooperating with the mechanical linking assembly 103, and an intermediate part 132 having a spherical external surface 142.

The frame 101 comprises a support part having a spherical internal surface 111 receiving the intermediate part 132 of the lever 102. The lever 102 is connected to the frame 101 by a ball-joint link 150 constituted by the spherical external surface 142 of the intermediate part 132 of the lever 102 and the complementary spherical internal surface 111 of the support part of the frame 101.

The mechanical linking assembly 103 comprises two pairs of linking pieces, including a first pair of linking pieces 113, 123 and a second pair of linking pieces 133, 143.

Each linking piece 113, 123 of the first pair is mounted mobile in rotation relative to the frame 101 about a first axis of rotation (axis X) by means of first pivot links 110 and 120.

Similarly, each linking piece 133, 143 of the second pair is mounted mobile relative to the frame 101 about a second axis of rotation (axis Y) by means of second pivot links 130 and 140.

When the joystick 100 is in neutral position (that is, when the pilot is exerting no stress on the lever 102), the second axis of rotation (axis Y) is perpendicular to the first axis of rotation (axis X). Also, the first axis of rotation and the second axis of rotation intersect at a point of intersection O which is also the centre of rotation of the lever 102 relative to the frame 101, centre of the ball-joint link 150 (shown offset in the figure according to the axis Z' with the sole purpose of clarifying the view of the pieces on the drawing).

The mechanical linking assembly 103 also comprises four sets of cradles 153, 163, 173 and 183, including two first sets of cradles 153, 163 and two second sets of cradles 173, 183. Each set of cradles comprises a cradle frame and a lever cradle.

In each first set of cradles 153, 163, the cradle frame 154, 164 is mounted connected to the first linking pieces 113, 123, such that rotation of the first linking pieces 113, 123 about the first axis of rotation X also causes rotation of the first sets of cradles 153, 163. Also, the lever cradle 155, 165 is mounted mobile in rotation relative to the cradle frame 154, 164 according to a third axis of rotation (axis Y') perpendicular to the first axis of rotation (axis X).

Similarly, in each second set of cradles 173, 183, the cradle frame 174, 184 is mounted connected to the second linking pieces 133, 143, such that rotation of the second linking pieces 133, 143 about the second axis of rotation Y also causes rotation of the second sets of cradles 173, 183. Also, the lever cradle 175, 185 is mounted mobile in rotation relative to the external cradle 174, 184 according to a fourth axis of rotation (axis X') perpendicular to the second axis of rotation (axis Y).

In this first embodiment, the lever cradles 155, 165, 175 and 185 constitute intermediate pieces of the mechanical linking assembly 103 to link the linking pieces to the lever 102.

More precisely, in each first set of cradles 153, 163, the lever cradle 155, 165 is capable of being driven in rotation relative to the cradle frame 154, 164 (and consequently relative to the first linking piece) under the action of the lever 102 about the third axis of rotation. As is clear from FIG. 1B, rotation of the lever 102 about the third axis (axis Y') concurrently causes rotation of the second sets of cradles 173, 183 and the second linking pieces 133, 143 about the second axis of rotation relative to the frame (axis Y).

Similarly, in each second set of cradles 173, 183, the lever cradle 175, 185 is capable of being driven in rotation relative to the cradle frame 174, 184 (and consequently relative to the second linking piece) under the action of the lever 102 about the fourth axis of rotation. As is clear from FIG. 1A, rotation of the lever 102 about the fourth axis (axis X') concurrently causes rotation of the first sets of cradles 153, 163 and the first linking pieces 113, 123 about the first axis of rotation relative to the frame 101 (axis X).

This is why the sets of cradles 153, 163, 173, 183 constitute for the lever 102 pivoting frameworks relative to the fixed framework defined by the frame 101.

As is illustrated in FIGS. 2A and 2B, the joystick 100 comprises a linking piece 113, a set of cradles including a cradle frame 154 fixed relative to the linking piece 113 and a lever cradle 155 mobile relative to the cradle frame fixed 154 (and therefore relative to the linking piece), and a return member 156 extending between a linking piece 123 and the mobile lever cradle 155. The return member 156 is capable of exerting compensating torque tending to oppose rotation of the lever cradle 155 relative to the cradle frame 154, that is, oppose rotation of the lever 102 relative to the frame 101. The return member 156 comprises a linear coil spring 157 and a ribbon 158 winding about a portion of cylindrical surface of the lever cradle 155.

The ribbon 158 has a first end fixed to the portion of cylindrical surface and a second end fixed to a second end of the spring. The spring 157 has a first end fixed to the linking piece and a second end fixed to the second end of the ribbon. As is illustrated in FIG. 2B, rotation of the lever cradle 155 relative to the cradle frame 154 causes a winding of the ribbon 158 and extension of the spring 157, the extension of the spring 157 being proportional to the angle of rotation θ of the lever cradle 155 relative to the cradle frame 154 about the axis Y'. This mounting produces a linear return of force on the lever 102.

In FIGS. 2A and 2B, the lever cradle 155 is the external cradle and the cradle frame 154 is the internal cradle of the set of cradles 153. This is why the return member 156 exerts a return force on the external lever cradle 155.

FIGS. 3, 4A and 4B show a example of mounting in which, in each set of cradles 173, 183, the lever cradle 175, 185 is the internal cradle and the cradle frame 174, 184 is the external cradle. The return member 176, 186 exerts a return force on the internal lever cradle 175, 185.

In these figures, only the second linking pieces 133, 143 and the second sets of cradles 173, 183 have been shown. However, the same mounting is done for the first linking pieces 113, 123 and the first sets of cradles 153, 163.

As is apparent in FIGS. 4A and 4B, the lower part 122 of the lever 102 comprises four protuberances 152, 162, 172 and 182. Also, each lever cradle 155, 165, 175 and 185 has a stop. Each protuberance 152, 162, 172 and 182 is capable of supporting against a corresponding stop of a lever cradle 155, 165, 175 and 185 to drive the lever cradle in rotation.

The protuberances and the stops are arranged such that rotation of the lever 102 according to the fourth axis of rotation (axis X') in a first direction causes rotation of the lever cradle 175 relative to the cradle frame 174, without driving the lever cradle 185 in rotation. Inversely, rotation of the lever 102 according to the fourth axis of rotation (axis X') in a second direction, opposite the first direction, causes rotation of the lever cradle 185 relative to the cradle frame 184, without driving the lever cradle 175 in rotation.

As each lever cradle 155, 165, 175, 185 is fitted with its own return member, it is possible to provide return members 156, 166, 176, 186 having different characteristics to produce a different return of force according to the direction of stress of the lever about the axis X' and of the axis Y'.

Also, the proposed mounting allows working with the return members 156, 166, 176, 186 only in traction, such that no guide device of the return members is necessary and any risk of buckling of the elements constituting these return members is eliminated, whether this is the ribbon 158 or the linear coil spring 157.

Also, this mounting creates a joystick 100 in which the return members 156, 166, 176, 186 are mounted by being prestressed in traction, that is, each return member 156, 166, 176, 186 exerts a non-zero return force on the lever 102 when the lever 102 is in neutral position. This creates a force threshold to be overcome during initialisation of displacement of the lever.

FIGS. 5A to 5C schematically illustrate an example of a return member 156 for generating double stiffness in a direction of rotation.

To this end, the return member 156 comprises a spring 157 and a stop 159. The spring 157 has a first spring portion 1571 and a second spring portion 1572 mounted in series with the first spring portion 1572, the stop 159 being interposed between a coil of the first spring portion 1571 and a coil of the second spring portion 1572.

In FIG. 5A, the spring 157 is initially in neutral position, that is, the lever 102 is not subjected to any stress by the pilot.

FIGS. 5B and 5C illustrate the spring 157 when the lever 102 is stressed by the pilot about the axis of rotation Y'.

In FIG. 5B, during a first phase, the spring 157 has been stretched by a first length $L_1$. The two spring portions 1571 and 1572 have elongated until a coil of the first spring portion 1571 is supported against the stop 159. Once the coil of the first spring portion 1571 is supported against the stop 159, the first spring portion 1571 can no longer be elongated.

In FIG. 5C, during a second phase, the spring a been stretched by a second length $L_2$, greater than the first length $L_1$, but only the second spring portion 1572 has elongated, the first spring portion 1571 being neutralised by the stop 159.

FIG. 5D illustrates the intensity of the return force F generated by the return member 156 as a function of the extension L of the spring 157. It is evident that the force F generated follows a double slope law of force. During the first phase, the two spring portions are stressed, such that the force generated exhibits a linear variation having a first slope. During the second phase, only the second spring portion is stressed such that the force exhibits a linear variation having a second slope, greater than the first slope.

In a variant of the first embodiment, the ball-joint link 150 connecting the lever 102 to the frame 101 can be replaced by a cardan link 20. FIGS. 6A to 6C schematically illustrate an example of a cardan system 21 which can be used to mount the lever 102 on the casing 101 of the joystick 100. The system illustrated reduces friction forces and eliminates any risk of scuffing. Also, the generally flat form of the cardan system 21 illustrated frees up space above the centre of rotation 132 of the lever 102, which is particularly advantageous in a cramped environment.

The cardan system 21 illustrated in FIGS. 6A to 6C comprises a base plane 22, a flat intermediate piece 23, and two support pieces 24 and 25. The base plane 22 is fixed to the frame 101 of the joystick 100 and the lever 102 is fixed to the two support pieces 24 and 25.

The cardan system 21 comprises in addition two flexible blades 26, 27 linking the base 22 to the intermediate piece 23 and enabling rotation of the intermediate piece 23 relative to the flat base 22 according to a first axis of rotation (axis x).

The cardan system 21 also comprises two flexible blades 28, 29 linking the intermediate piece 23 to the support pieces 24, 25 and enabling rotation of the support pieces 24, 25 relative to the intermediate piece 23 according to a second axis of rotation (axis y) perpendicular to the first axis of rotation.

In this way, the lever 102 can be driven in rotation relative to the casing according to the two axes of rotation x and y, these two axes of rotation being fixed relative to the frame 101.

FIGS. 7A to 7C schematically illustrate a joystick 200 according to a second embodiment of the invention.

In this second embodiment, the sets of cradles 153, 163, 173 and 183 have been replaced by ball bearings 253, 263, 273, 283, each bearing comprising a ring lever 255, 265, 275, 285 and a ring frame 254, 264, 274, 284.

In FIGS. 7A to 7C, the joystick 200 comprises a frame 201, a lever 202 mounted mobile in rotation relative to the frame, and a mechanical linking assembly 203 of the lever on the frame.

The mechanical linking assembly 203 comprises two pairs of linking pieces, including a first pair of linking pieces 213, 223 and a second pair of linking pieces 233, 243.

Each linking piece 213, 223 of the first pair is mounted mobile in rotation relative to the frame 201 about a first axis of rotation (axis X) by means of first pivot links 210 and 220.

Similarly, each linking piece 233, 243 of the second pair is mounted mobile relative to the frame 201 about a second axis of rotation (axis Y) by means of second pivot links 230 and 240.

The mechanical linking assembly 203 also comprises four bearings 253, 263, 273 and 283, including a first couple of bearings 253, 263 and a second couple of bearings 273, 283. Each bearing comprises a ring lever and a ring frame.

In each bearing 253, 263 of the first couple, the ring frame 254, 264 is mounted connected to the first linking pieces 213, 223, such that rotation of the first linking pieces 213, 223 about the first axis of rotation X also causes rotation of the bearings 253, 263. Also, the ring lever 255, 265 is mounted mobile in rotation relative to the ring frame 254, 264 according to a third axis of rotation (axis Y') perpendicular to the first axis of rotation (axis X).

Similarly, in each bearing 273, 283 of the second couple, the ring frame 274, 284 is mounted connected to the second linking pieces 233, 243, such that rotation of the second linking pieces 233, 243 about the second axis of rotation Y also causes rotation of the bearings 273, 283. Also, the ring lever 275, 285 is mounted mobile in rotation relative to the ring frame 274, 284 according to a fourth axis of rotation (axis X') perpendicular to the second axis of rotation (axis Y).

In this second embodiment, the lever rings 255, 265, 275 and 285 constitute intermediate pieces of the mechanical linking assembly 203 to link the linking pieces to the lever 202.

As is illustrated in FIGS. 8A to 8C, the joystick 200 comprises a return member 256 extending between a linking piece 223 and the ring lever 255, as in the first embodiment. The return member 256 is capable of exerting compensating torque tending to oppose rotation of the ring lever 255 relative to the ring frame 254, that is, opposing rotation of the lever 202 relative to the frame 201. The return member 256 comprises a linear coil spring 257 and a ribbon 258 winding about a portion of cylindrical surface 259 of the ring lever 255.

FIG. 8A illustrates the return member 256 when the lever 202 is in neutral position.

FIG. 8B illustrates the return member 256 when the lever 202 is driven in rotation about the axis Y' in a first direction of rotation. The ring lever 255, driven in rotation by the lever 202, does not drive the ribbon 258, which does not wind about the cylinder portion of the ring lever 255, leaving elongation of the spring 257 unchanged.

FIG. 8C illustrates the return member 256 when the lever 202 is driven in rotation about the axis Y' in a second direction of rotation, opposite the first direction of rotation. The lever 202 drives in rotation the ring lever 255, the effect of which is to wind the ribbon 258 about the ring lever 255. The ribbon 258 exerts traction on the spring 257 which elongates and generates a return force tending to oppose rotation of the ring lever 255 relative to the ring frame 254.

FIGS. 9A and 9B schematically illustrate an alternative mounting for producing dissociation of both directions of rotation on the same axis. In this alternative, each lever cradle 175 and 185 has a stop. The lower part 122 of the lever 102 is capable of supporting against a stop of the lever cradle 175 and 185 to drive the lever in rotation cradle.

The stops are arranged such that rotation of the lever 102 according to the fourth axis of rotation (axis X') in a first direction causes rotation of the lever cradle 175 relative to the cradle frame 174, without driving the lever cradle 185 in rotation. Inversely, rotation of the lever 102 according to the fourth axis of rotation (axis X') in a second direction, opposite the first direction, causes rotation of the lever cradle 185 relative to the cradle frame 184, without driving the lever cradle 175 in rotation.

In FIG. 9A, the lever 102 is in contact with the stops according to a rectilinear line of contact. In FIG. 9B, the lever 202 is in contact with the stops according to a cylindrical contact surface. In these two cases, contact between the lever 102 and the stops enables rotation of the lever 102 relative to the lever cradles 175 and 185 about the axis Z' without engendering any parasite rotation of the lever cradles 175 and 185 relative to the frame cradles 174 and 184, indispensable to not generate coupling between the axes X' and Y.

It is evident that the alternative mounting of FIGS. 9A and 9B needs the device to include linking of the lever 102 with the frame 101, such as a ball-joint link 150 for example.

FIG. 10 schematically illustrates a first variant of the joystick 200 of FIGS. 7A to 7C.

In this first variant, the pivots 220 and 210 are mounted fixed on the frame 201, while the pivots 230 and 240 are rotatably mounted relative to the frame 201. In other words, the second linking pieces 233 and 243 are mounted mobile in rotation relative to the frame 201 about a fifth axis (axis Z), the fifth axis being perpendicular to the first axis (axis X) and to the second axis (axis Y) and passing through the centre of rotation O of the lever 202.

For this purpose, the mechanical linking assembly 203 comprises a fifth bearing 293 comprising an external ring 294 mounted fixed relative to the frame 201 and an internal ring 295 mounted mobile in rotation relative to the external ring 294 (and therefore relative to the frame 201) about the axis Z. The linking pieces 233 and 243 are rotatably mounted on the internal ring 295 about the axis Y by means of the pivots 230 and 240.

This mounting enables rotation of the fixed frameworks (Y defined by the linking pieces 233 and 243) relative to the other framework fixed (X defined by the linking pieces 213 and 223) about the axis Z, whereas the two axes X' and Y' of the pivoting framework remain fixed and orthogonal relative to each other.

This mounting enables a variation in the angle formed between the first axis of rotation X and the second axis of rotation Y, the first axis of rotation X being fixed relative to the frame 201.

Because of this mounting, misalignment between the second axis of rotation Y and the third axis of rotation Y' is possible. This added degree of liberty, made indispensable by projection of rotation vectors, allows displacement of the lever 202 in rotation simultaneously according to the first axis of rotation X and according to the second axis of rotation Y.

FIG. 11 schematically illustrates a second variant of the joystick of FIGS. 7A to 7C in which the first axis of rotation X and the second axis of rotation Y are mobile relative to the frame 201.

In this second variant, the mechanical linking assembly 203 comprises a fifth bearing 293 comprising an external ring 294 and an internal ring 295, each of the rings 294 and 295 being mounted mobile in rotation relative to the frame 201 about the axis Z. The mechanical linking assembly 203 also comprises a plurality of rollers 296 interposed between the rings 294 and 295 and mounted mobile in rotation relative to the frame 201 about their axis, which are parallel to the axis Z and fixed relative to the frame 201.

The rollers 296 link the rings 294 and 295 in rotation such that rotation of one of the rings relative to the frame 201 in a direction concurrently causes rotation of the other ring in the opposite direction by an identical angle.

This mounting also enables rotation of the fixed frameworks X and Y relative to each other (defined on the one hand by the linking pieces 213 and 223 and on the other hand by the linking pieces 233 and 243) about the axis Z, while the two axes X' and Y' of the pivoting framework remain fixed and orthogonal relative to each other.

Because of this mounting, misalignment between the first axis of rotation X and the fourth axis of rotation X' on the one hand, and between the second axis of rotation Y and the third axis of rotation Y' on the other hand, is possible, said misalignments being symmetrical.

This added degree of liberty, made indispensable by projection of rotation vectors, allows displacement of the lever 202 in rotation simultaneously according to the first axis of rotation X and according to the second axis of rotation Y, and without causing rotation of the lever according to the axis Z'.

FIG. 12 schematically illustrates a third variant of the joystick 200 of FIGS. 7A to 7C in which the bearings are mobile in rotation.

In this third variant, the bearings 253 and 263 are mounted fixed relative to the lever 202, while the bearings 273 and 283 are mounted to rotate relative to the lever 202. Otherwise expressed, the intermediate pieces 275 and 285 (formed by the mobile rings of the bearings 273 and 283) are mounted mobile in rotation relative to the lever 202 about a fifth axis (axis Z'), the fifth axis being perpendicular to the third axis (axis Y') and the fourth axis (axis X') and passing through the centre of rotation O of the lever 202.

For this purpose, the mechanical linking assembly 203 comprises a fifth bearing 293 comprising an internal ring 295 mounted fixed relative to the lever 202 and an external ring 294 mounted mobile relative to the internal ring 295 (and therefore relative to the lever 202) about the axis Z'. The intermediate pieces 275 and 285 are mounted fixed on the external ring 294 of the fifth bearing 293.

This mounting enables rotation of the lever 202 relative to the pivoting frameworks (defined by the linking pieces 233 and 243) about the axis Z' (longitudinal axis of the lever 202).

This mounting enables variation in the angle formed between the third axis of rotation Y' and the fourth axis of rotation X', the third axis of rotation Y' being fixed relative to the lever 202.

Because of this mounting, misalignment between the third axis of rotation Y' and the second axis of rotation Y is possible. This added degree of liberty, made indispensable by projection of rotation vectors, allows displacement of the lever 202 in rotation simultaneously according to the first axis of rotation X and according to the second axis of rotation Y.

FIG. 13 schematically illustrates a fourth variant of the joystick of FIGS. 7A to 7C. This fourth variant has a function identical to that of the third variant. While the third variant allows the use of identical bearings 253, 263, 273 and 283, the fourth variant is more compact and includes embedded bearings.

In this fourth variant, the external ring 294 of the fifth bearing 293 is fixed to the internal lever rings 275 and 285 of bearings 273 and 283 of the second pair.

The internal ring 295 of the fifth bearing 293 is fixed to the external lever rings 255 and 265 of the bearings 253 and 263 of the first pair.

FIG. 14 schematically illustrates a fifth variant of the joystick of FIGS. 7A to 7C, in which the fourth axis of rotation X' and the third axis of rotation Y' are mobile relative to the lever 202.

In this fifth variant, the mechanical linking assembly 203 comprises a fifth bearing 293 comprising an external ring 294 and an internal ring 295, each of the rings 294 and 295 being mounted mobile in rotation relative to the lever 202 about the axis Z'. The mechanical linking assembly 203 also comprises a plurality of rollers 296 interposed between the rings 294 and 295 and mounted mobile in rotation relative to the lever about their axes which are parallel to the axis Z and fixes relative to the lever 202.

The rollers 296 link the rings 294 and 295 in rotation such that rotation of one of the rings relative to the lever 202 in a direction concurrently causes rotation of the other ring in the opposite direction by an identical angle.

This mounting enables rotation of the lever 202 relative to each of the pivoting frameworks (the pivoting frameworks being defined respectively by the linking pieces 213 and 223 and by the linking pieces 233 and 243) about the axis Z'.

Because of this mounting, misalignment between the first axis of rotation X and the fourth axis of rotation X' on the one hand, and between the second axis of rotation Y and the third axis of rotation Y' on the other hand, is possible, said misalignments being symmetrical.

This mounting, because of this added degree of liberty made indispensable by projection of rotation vectors, also allows displacement of the lever 202 in rotation simultaneously according to the first axis of rotation X and according to the second axis of rotation Y, and without causing rotation of the lever according to the axis Z'.

Figure 15:
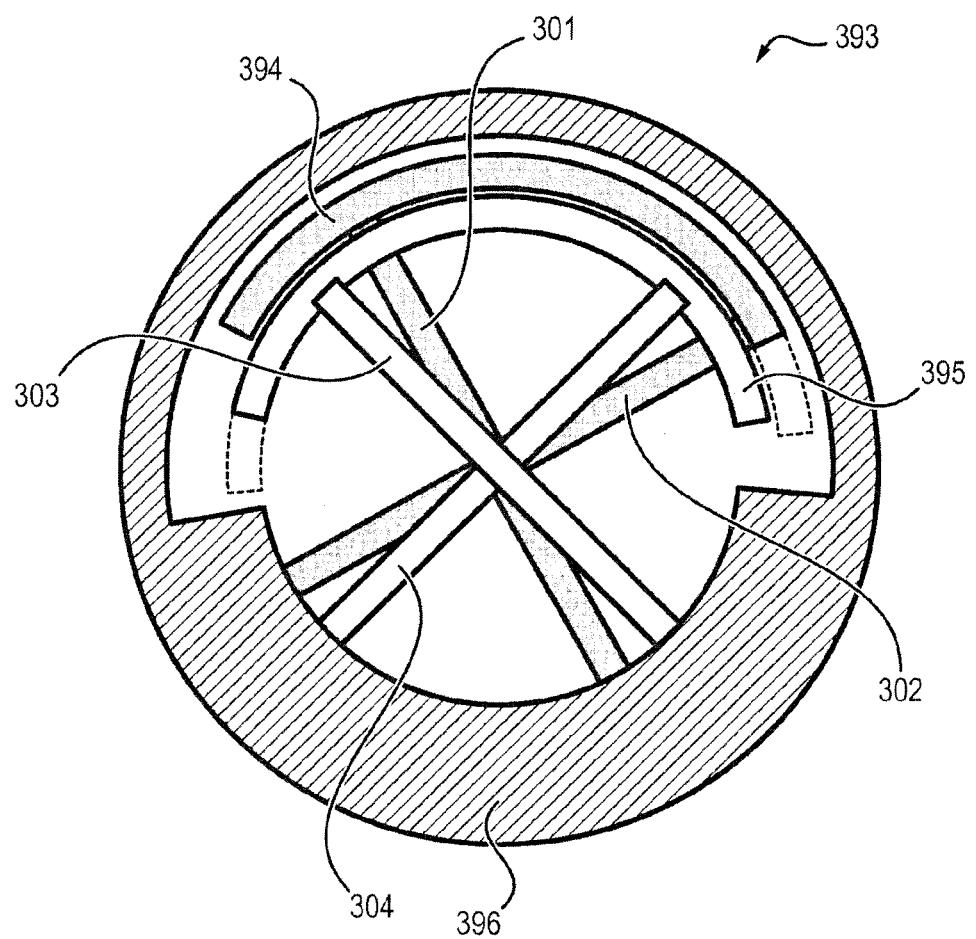

FIG. 15 schematically illustrates a linking member 393 which can be used in the variant of FIG. 14 in place of the fifth bearing 293 and of the plurality of associated rollers 296.

The linking member 393 illustrated comprises a first part 394, a second part 395 and a third part 396. The first part 394 is mounted mobile relative to the third part 396. Similarly, the second part 395 is mounted mobile relative to the third part 396.

The linking member 393 also comprises two couples of flexible blades 301 and 302, 303 and 304. Each flexible blade 301, 302 of the first couple connects the first part 394 and the third part 396 together and is elastically deformable to enable rotation of the third part 396 relative to the first part 394. The flexible blades 301 and 302 are capable of generating compensating torque tending to oppose the rotation of the parts 394 and 396 together.

Similarly, each flexible blade 303, 304 of the second couple connects the second part 395 and the third part 396 together and is elastically deformable to enable rotation of the third part 396 relative to the second part 395. The flexible blades 303, 304 are capable of generating compensating torque tending to oppose rotation of the parts 395 and 396 together.

The first part 394 is fixed to the intermediate pieces 275 and 285.

The second part 395 is fixed to the intermediate pieces 255 and 265.

The third part 396 is fixed to the lever 202.

As in the case of the joystick of FIG. 14, this mounting enables rotation of the lever 202 relative to each of the pivoting frameworks (the pivoting frameworks being respectively defined by the linking pieces 213 and 223 and by the linking pieces 233 and 243) about the axis Z'.

Because of this mounting, misalignment between the first axis of rotation X and the fourth axis of rotation X on the one hand, and between the second axis of rotation Y and the third axis of rotation Y' on the other hand, is possible, said misalignments being symmetrical.

This mounting, because of this added degree of liberty made indispensable by projection of rotation vectors, also enables displacement of the lever 202 in rotation simultaneously according to the first axis of rotation X and according to the second axis of rotation Y, and without causing rotation of the lever according to the axis Z'.

REFERENCE NUMBERS

100 Joystick (first embodiment)
101 Frame
102 Lever
103 Mechanical link assembly
110 Pivot link (axis X)
111 Spherical internal surface
112 Lower part of the lever
113 Link piece (first pair)
120 Pivot link (axis X)
122 Lower part of the lever
123 Link piece (first pair)
130 Pivot link (axis Y)
132 Intermediate part of the lever
133 Link piece (second pair)
140 Pivot link (axis Y)
142 Spherical external surface
143 Link piece (second pair)
150 Ball-joint link
152 Protuberance
153 Set of cradles (first sets)
154 Frame cradle
155 Lever cradle
156 Return member
157 Linear coil spring
158 Ribbon
159 Stop
162 Protuberance
163 Set of cradles (first sets)
164 Frame cradle
165 Lever cradle
166 Return member
172 Protuberance
173 Set of cradles (second sets)
174 Frame cradle
175 Lever cradle
176 Return member
182 Protuberance
183 Set of cradles (second sets)
184 Frame cradle
185 Lever cradle
186 Return member
200 Joystick (second embodiment)
201 Frame
202 Lever
203 Mechanical link assembly
210 Pivot link (axis X)
213 Link piece (first pair)
220 Pivot link (axis X)
222 Lower part of the lever
223 Link piece (first pair)
230 Pivot link (axis Y)
233 Link piece (second pair)
240 Pivot link (axis Y)
243 Link piece (second pair)
253 Ball bearing (first couple)
254 Frame ring
255 Lever ring
256 Return member
257 Linear coil spring
258 Ribbon
259 Portion of cylindrical surface
263 Ball bearing (first couple)
264 Frame ring
265 Lever ring
266 Return member
267 Linear coil spring
269 Portion of cylindrical surface
273 Ball bearing (second couple)
274 Frame ring
275 Lever ring
276 Return member
277 Linear coil spring
279 Portion of cylindrical surface
283 Ball bearing (second couple)
284 Frame ring
285 Lever ring
286 Return member
287 Linear coil spring
289 Portion of cylindrical surface
293 Fifth bearing
294 External ring
295 Internal ring
296 Rollers
301 Flexible blade (first couple)
302 Flexible blade (first couple)
303 Flexible blade (second couple)

304 Flexible blade (second couple)
20 Cardan link
21 Cardan system
22 Flat base
23 Intermediate piece
24 Support piece
25 Support piece
26 Flexible blade
27 Flexible blade
28 Flexible blade
29 Flexible blade
393 Link member
394 First part of the linking member
395 Second part of the linking member
396 Third part of the linking member
1571 First spring portion
1572 Second spring portion

The invention claimed is:

1. A joystick for controlling an aircraft, comprising a frame, a lever mounted mobile in rotation relative to the frame, and a mechanical linking assembly of the lever to the frame, the mechanical linking assembly comprising:
  a first linking piece mounted mobile relative to the frame about a first axis of rotation,
  a second linking piece mounted mobile relative to the frame about a second axis of rotation, the second axis of rotation forming a non-zero angle with the first axis of rotation,
  a third intermediate piece mounted mobile in rotation relative to the first linking piece about a third axis of rotation,
  a fourth intermediate piece mounted mobile in rotation relative to the second linking piece about a fourth axis of rotation, the fourth axis of rotation forming a non-zero angle with the third axis of rotation,
  in which the linking pieces or the intermediate pieces are mobile in rotation one relative to the other about a fifth axis of rotation forming a non-zero angle respectively with the first axis of rotation and the second axis of rotation or with the third axis of rotation and the fourth axis of rotation so as to authorise respectively a variation of the angle formed between the first axis of rotation and the second axis of rotation or of the angle formed between the third axis of rotation and the fourth axis of rotation.

2. The joystick according to claim 1, in which the mechanical linking assembly comprises a linking member comprising an external ring and an internal ring rotatably mounted one relative to the other about the fifth axis of rotation, each of the linking pieces or respectively the intermediate pieces being connected to a respective ring of the linking member, the lever being connected to the third intermediate piece and/or of the fourth intermediate piece.

3. The joystick according to claim 2, wherein one of the rings of the linking member is fixed relative to the first linking piece and the other ring is fixed relative to the second linking piece.

4. The joystick according to claim 3, wherein one of the rings of the linking member is fixed relative to the frame so as to authorise rotation only of the first linking piece or only of the second linking piece relative to the frame about the fifth axis of rotation.

5. The joystick according to claim 3, wherein the linking member comprises at least one roller rotatably mounted about an axis of rotation fixed relative to the frame, the roller being interposed between the internal ring and the external ring such that rotation of one of the rings relative to the frame concurrently causes rotation in the opposite direction of the other ring relative to the frame.

6. The joystick according to claim 2, wherein one of the rings of the linking member is fixed relative to the third intermediate piece and the other ring is fixed relative to the fourth intermediate piece.

7. The joystick according to claim 6, wherein one of the rings of the linking member is fixed relative to the lever so as to authorise rotation of the lever only relative to the third intermediate piece or only relative to the fourth intermediate piece about the fifth axis of rotation.

8. The joystick according to claim 6, wherein the linking member comprises at least a roller rotatably mounted about an axis of rotation fixed relative to the lever, the roller being interposed between the internal ring and the external ring such that rotation of one of the rings relative to the lever concurrently causes rotation in the opposite direction of the other ring relative to the lever.

9. The joystick according to claim 1, wherein the mechanical linking assembly comprises a linking member comprising a fixed part and a part mounted mobile relative to the fixed part, the linking member comprising at least two flexible blades, each flexible blade connecting the parts together and being elastically deformable to authorise rotation of the mobile part relative to the fixed part, the flexible blades being capable of generating compensating torque tending to oppose the rotation of the parts relative to each other.

10. The joystick according to claim 9, wherein the third intermediate piece or the fourth intermediate piece is fixed to one part of the linking member and the lever is fixed to the other part of the linking member.

11. The joystick according to claim 1, wherein the lever is connected to the frame by a ball-joint link enabling rotation of the lever according to the three axes of rotation relative to the frame.

12. The joystick according to claim 1, wherein the lever is connected to the frame by a cardan link enabling only rotation of the lever according to the first axis and rotation of the lever according to the second axis relative to the frame.

13. The joystick according to claim 12, wherein the lever is capable of simply bearing on the third intermediate piece and on the fourth intermediate piece to urge the intermediate pieces in rotation respectively according to the third and fourth axes so as to authorise relative rotation of the intermediate pieces relative to the lever according to the fifth axis of rotation.

14. The joystick according to claim 13, wherein one of the intermediate pieces comprises a stop arranged such that the lever is capable of bearing on the stop to stress the intermediate piece and cause the rotation of the intermediate piece in a single direction of stress.

15. The joystick according to claim 14, wherein the lever is capable of bearing on the stop according to a rectilinear line of contact, parallel to the fifth axis of rotation.

16. The joystick according to claim 14, wherein the lever is capable of bearing on the stop according to a cylindrical contact surface, having an axis of revolution parallel to the fifth axis of rotation.

17. The joystick according to claim 1, comprising a return member capable of urging one of the intermediate pieces of the linking member to oppose rotation of the intermediate piece.

18. The joystick according to claim 17, wherein the return member comprises a traction spring connecting the first linking piece or the second linking piece to the intermediate piece which is driven in rotation under the action of the lever.

19. The joystick according to claim 18, wherein the return member comprises a ribbon connecting the traction spring and the intermediate piece, the ribbon being capable of winding about a cylindrical element and connected to the intermediate piece.

\* \* \* \* \*